(12) United States Patent
Musuluri et al.

(10) Patent No.: US 10,540,408 B2
(45) Date of Patent: Jan. 21, 2020

(54) SYSTEM AND METHOD FOR CONSTRUCTING SEARCH RESULTS

(71) Applicants: Harshini Musuluri, Birmingham, AL (US); Aravind Musuluri, Birmingham, AL (US)

(72) Inventors: Harshini Musuluri, Birmingham, AL (US); Aravind Musuluri, Birmingham, AL (US)

(*) Notice: Subject to any disclaimer, the term of this patent is extended or adjusted under 35 U.S.C. 154(b) by 298 days.

(21) Appl. No.: 15/239,816

(22) Filed: Aug. 17, 2016

(65) Prior Publication Data

US 2017/0053026 A1 Feb. 23, 2017

Related U.S. Application Data

(60) Provisional application No. 62/205,834, filed on Aug. 17, 2015.

(51) Int. Cl.
*G06F 17/30* (2006.01)
*G06F 16/951* (2019.01)

(52) U.S. Cl.
CPC .................... *G06F 16/951* (2019.01)

(58) Field of Classification Search
USPC ........................................................ 707/722
See application file for complete search history.

(56) References Cited

U.S. PATENT DOCUMENTS

| | | | | |
|---|---|---|---|---|
| 7,379,811 | B2* | 5/2008 | Rasmussen | G01C 21/32 701/532 |
| 7,676,455 | B2* | 3/2010 | Ursitti | G06Q 10/10 707/804 |
| 7,894,984 | B2* | 2/2011 | Rasmussen | G01C 21/32 701/452 |
| 8,014,946 | B2* | 9/2011 | Rasmussen | G01C 21/32 701/439 |
| 9,292,618 | B2* | 3/2016 | Melnyk | H04L 67/2823 |
| 9,842,380 | B2* | 12/2017 | Rasmussen | G01C 21/32 |
| 2005/0270311 | A1* | 12/2005 | Rasmussen | G01C 21/32 345/677 |
| 2008/0027933 | A1* | 1/2008 | Hussam | G06F 16/904 |
| 2008/0291205 | A1* | 11/2008 | Rasmussen | G01C 21/32 345/441 |
| 2010/0201707 | A1* | 8/2010 | Rasmussen | G01C 21/32 345/620 |
| 2011/0137766 | A1* | 6/2011 | Rasmussen | G01C 21/32 705/30 |
| 2012/0075337 | A1* | 3/2012 | Rasmussen | G01C 21/32 345/629 |
| 2013/0346396 | A1* | 12/2013 | Stamm | G06F 17/30867 707/722 |
| 2016/0077684 | A1* | 3/2016 | Liu | G06F 3/04847 715/765 |

* cited by examiner

*Primary Examiner* — Sheree N Brown

(57) ABSTRACT

Systems and methods for enhancing user experience in a search environment are provided. The method includes displaying results of a search operation, the display comprising an extract of at least one search result; the extract comprising a combination of at least one relevant portion of the text and at least one portion of a legend.

4 Claims, 7 Drawing Sheets

FIG. 3A

SYSTEM AND METHOD FOR CONSTRUCTING SEARCH RESULTS

CROSS REFERENCE TO RELATED APPLICATION

This application claims priority to U.S. Provisional Application Ser. No. 62/205,834 entitled "System And Method For Constructing Search Results" filed on Aug. 17, 2015, which is incorporated herein by reference.

TECHNICAL FIELD

The present disclosure generally relates to search engine operations and methods to display the results of a search operation. Particularly, the disclosure relates to a system and method for constructing search results incorporating legend information.

BACKGROUND

The statements in this section merely provide background information related to the present disclosure and may not constitute prior art.

It is commonly required in the field of Information Technology to provide a service that searches through data sources. The data source herein may refer to data and/or document(s) on the Internet, intranet, storage devices, and so on. In order to use a search engine, a user seeking information on a desired topic generally inputs a search query consisting of keyword(s) or phrase(s) relevant to the topic into the search interface of the search engine. In response, the search engine typically displays a report with a prioritized list of links pointing to relevant documents containing the search keywords. Oftentimes, a short summary of text i.e., extract/snippet is also included for each result. The snippet is that portion or portions of the text in the document that contain the keywords from the search query.

Sometimes, the extract may comprise of symbols or codes and the meaning or interpretation of the symbols or codes may not be part of the search result extract. However, the document may comprise of a legend with information on how to interpret the symbols or codes. Thus, the user has to navigate to the original document to fully understand the snippet. This process may be complicated and time consuming for the user.

In view of the above drawbacks, there remains a need for an effective method of constructing search results.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

According to the aspects illustrated herein, the present disclosure relates to a method to display the results of a search operation on at least one data source, the display comprising an extract of at least one search result; the extract comprising a combination of at least one relevant portion of the text and at least one portion of a legend.

In another aspect of the present disclosure, the invention relates to a method executable on a computing device comprising a processor, memory and a storage unit to display results of a search operation on at least one data source(s) comprising document(s), said method comprising: (a) Accepting a search query comprising keyword(s) from a user; (b) Generating search results by identifying documents comprising the keyword(s) in response to the search query; (c) Constructing a search extract for each search result comprising a relevant portion(s) of the corresponding document; (d) Identifying a legend for the search extract from the document; and (e) Returning the search results comprising the search result snippet and the legend.

In another aspect of the present disclosure is provided with a system comprising search engine unit. The search engine unit may comprise one or more logics configured to perform the functions and operations associated with the above disclosed methods.

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein:

FIG. 3A is a portion of an exemplary web page comprising of symbols.

DETAILED DESCRIPTION

Figure 1:
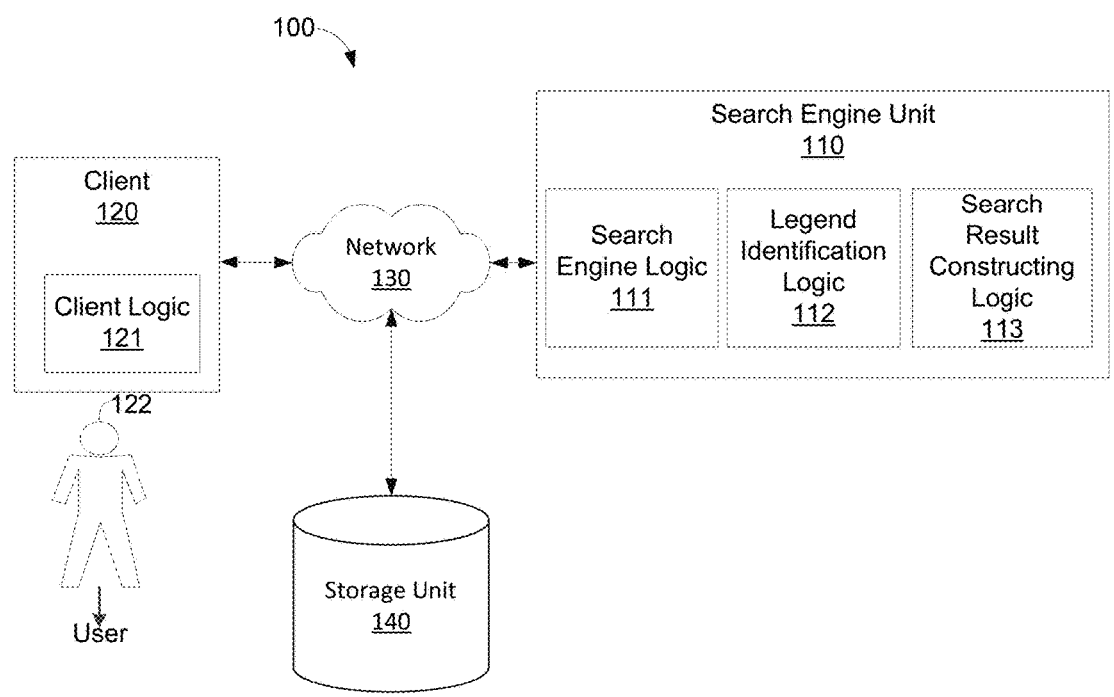
FIG. 1 is a block diagram illustrating an exemplary search environment in accordance with an embodiment of the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Power point documents, news group postings, multimedia objects, Graphics Interchange Format images and/or Shockwave Flash files.

Through the length of the specification and claims, the words "document" and "web page" are used interchangeably.

Through the length of the specification and claims, the words "extract" and "snippet" are used interchangeably.

Through the length of the specification and claims, the words "symbol", "key" and "code" are used interchangeably.

Through the length of the specification and claims, the words "legend" and "keys" are used interchangeably.

FIG. 1 depicts a system 100 for constructing search results in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 and the client 120 may be a dedicated or shared server including but not limited to any type of application server, database server, or file server configurable and combinations thereof. The search engine unit 110 and the client 120 may include, but are not limited to, a computer, handheld unit, mobile unit, consumer electronic unit, or the like.

The exemplary search engine unit 110 comprises search engine logic 111, legend identification logic 112 and search results constructing logic 113.

In the exemplary search engine unit 110, the search engine logic 111 may be configured to identify search results in response to a user search query.

The search engine unit 110 further comprises the legend identification logic 112. The legend identification logic 112 may be configured to identify a legend in the document for symbols within the snippet of a search result.

A symbol in accordance with the present disclosure may comprise of, but not limited to, text, background color, foreground color, image or any combinations thereof.

The search engine unit 110, further comprises search results constructing logic 113. The search results constructing logic 113, may be configured to construct search result. For a search result comprising of a symbol, the process of constructing the search result may include adding the legend to the search result.

The storage unit 140 is configured to store information associated with search results or the like. In various embodiments, such information may include, without limitation, domains, URLs, webpages, websites, indexes, legend information in webpages, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to constructing search results with legend. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. The single unit depictions are meant for clarity, not to limit the scope of embodiments in any form.

A user 122 through the client logic 121 on the client 120 may enter a search query consisting of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query the search engine unit 110 examines the storage unit 140 and compiles a prioritized list of documents containing all or some of the keyword(s) and returns the search results along with legend if necessary, to the client logic 121 which displays the results to the user 122 in a window.

Figure 2:
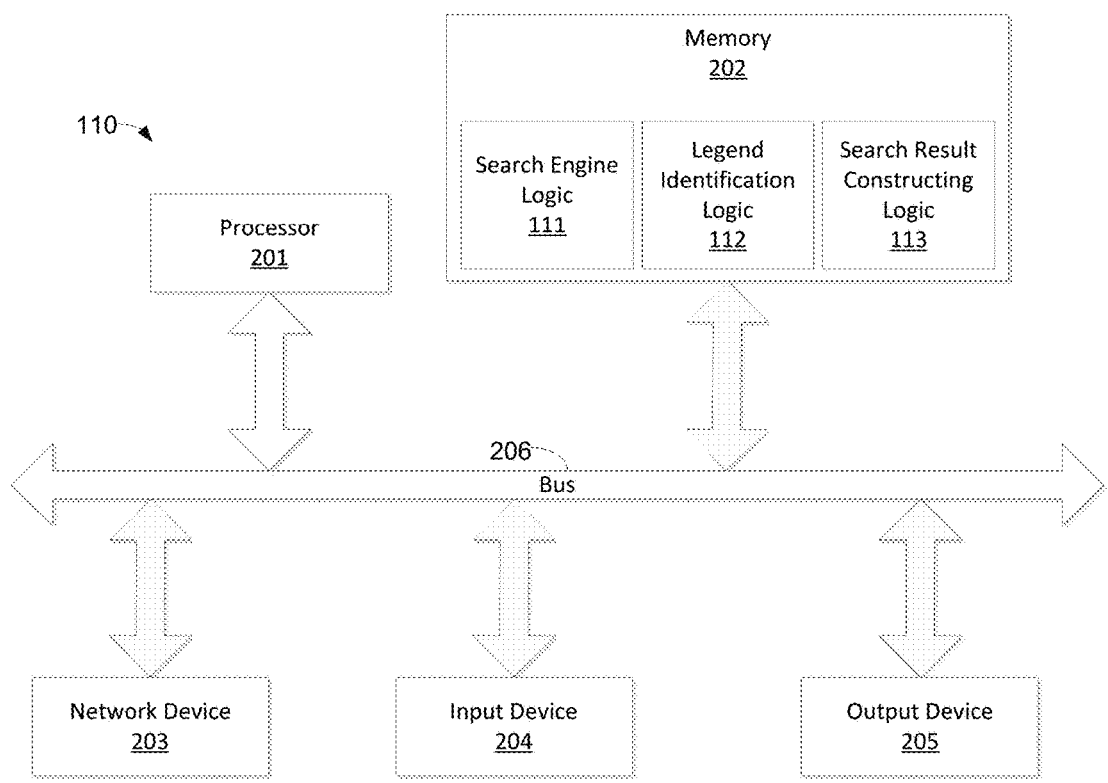
FIG. 2 is a block diagram of an exemplary computing device of FIG. 1.

In some preferred embodiments, the search engine unit 110 is shown in FIG. 2. It should be noted, however, that embodiments are not limited to implementation on such computing devices, but may be implemented on any of a variety of different types of computing units within the scope of embodiments hereof. The search engine unit 110 (as shown in FIG. 1) is only one example of a suitable computing/search environment and it is not intended to suggest any limitation as to the scope of use or functionality of the disclosure.

In some embodiments, the search engine unit 110 may include a bus 206, a processor 201, memory 202, network device 203, input device 204, and an output device 205. Bus 206 may include a path that permits communication among the components of the search engine unit 110.

The memory 202 stores the search engine logic 111, the legend identification logic 112 and the search results constructing logic 113 as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input device 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 110, depicted by FIG. 1, all the components are implemented by software and stored in memory 202.

Figure 3A:
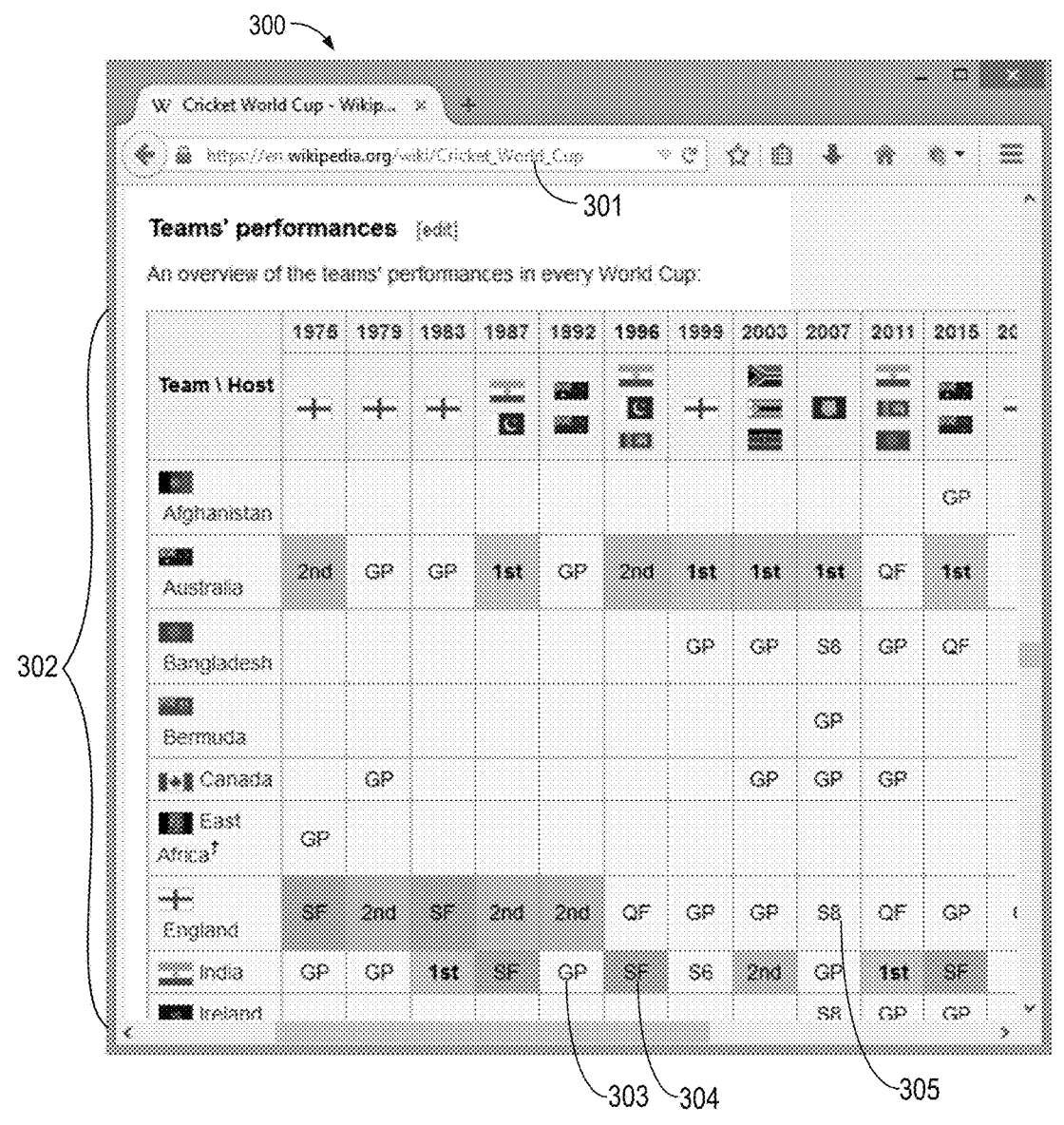
Figure 3B:
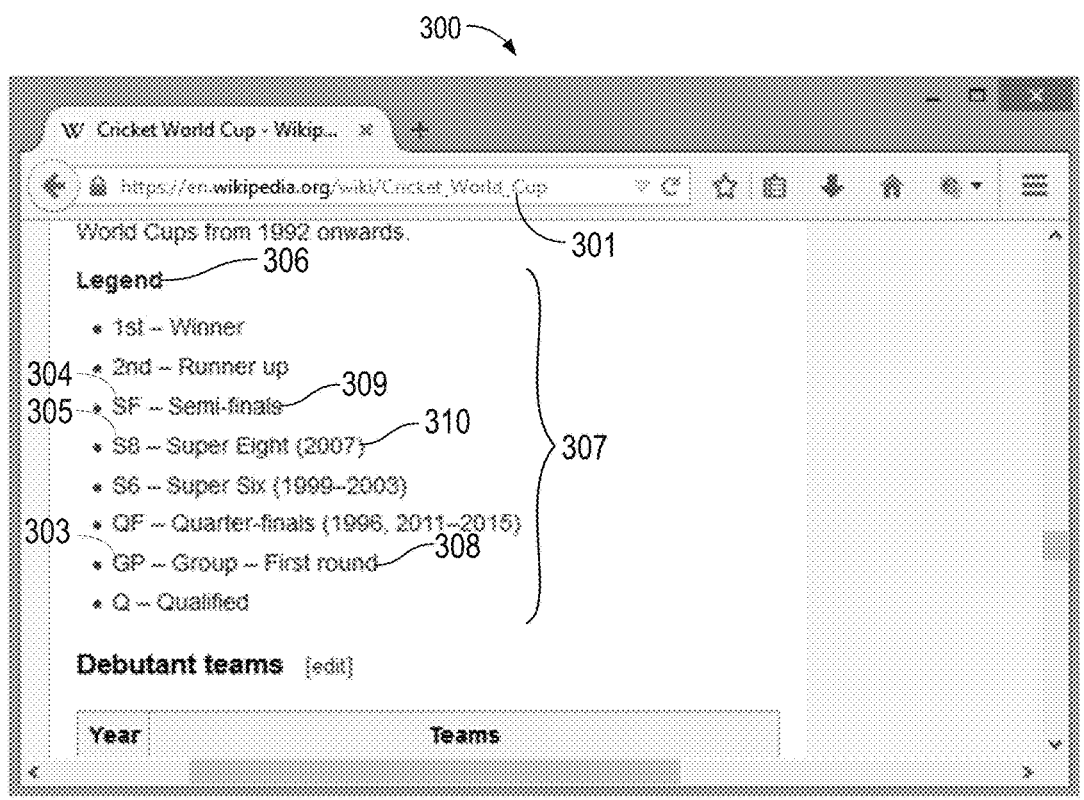
FIG. 3B is another portion of the exemplary web page of FIG. 3A comprising of a legend.

FIG. 3A and FIG. 3B illustrate portions of an exemplary web page 300 with a URL 301. The web page 300 comprises among other things text in the form of table 302 comprising of symbols "GP" 303, "SF" 304 and "S8" 305. The web page 300 further comprises of a legend 307 (FIG. 3B). The legend is in the form of key/value pairs comprises of the symbols "GP" 303, "SF" 304, and "S8" 305 and for each symbol a corresponding explanation 308, 309 and 310.

The legend 307 for the table 302 may be identified from the title "legend" 306. Note that in another embodiment the legend title may be different from 306. For example the title may be "keys".

In another embodiment the legend 307 may be identified by the key/value pair format of the legend and the presence of the keys in the table 302. Thus, the legend 307 is associated with the table 302.

Note that not all the symbols in exemplary text 302 and the legend 307 are marked for brevity.

Figure 4:
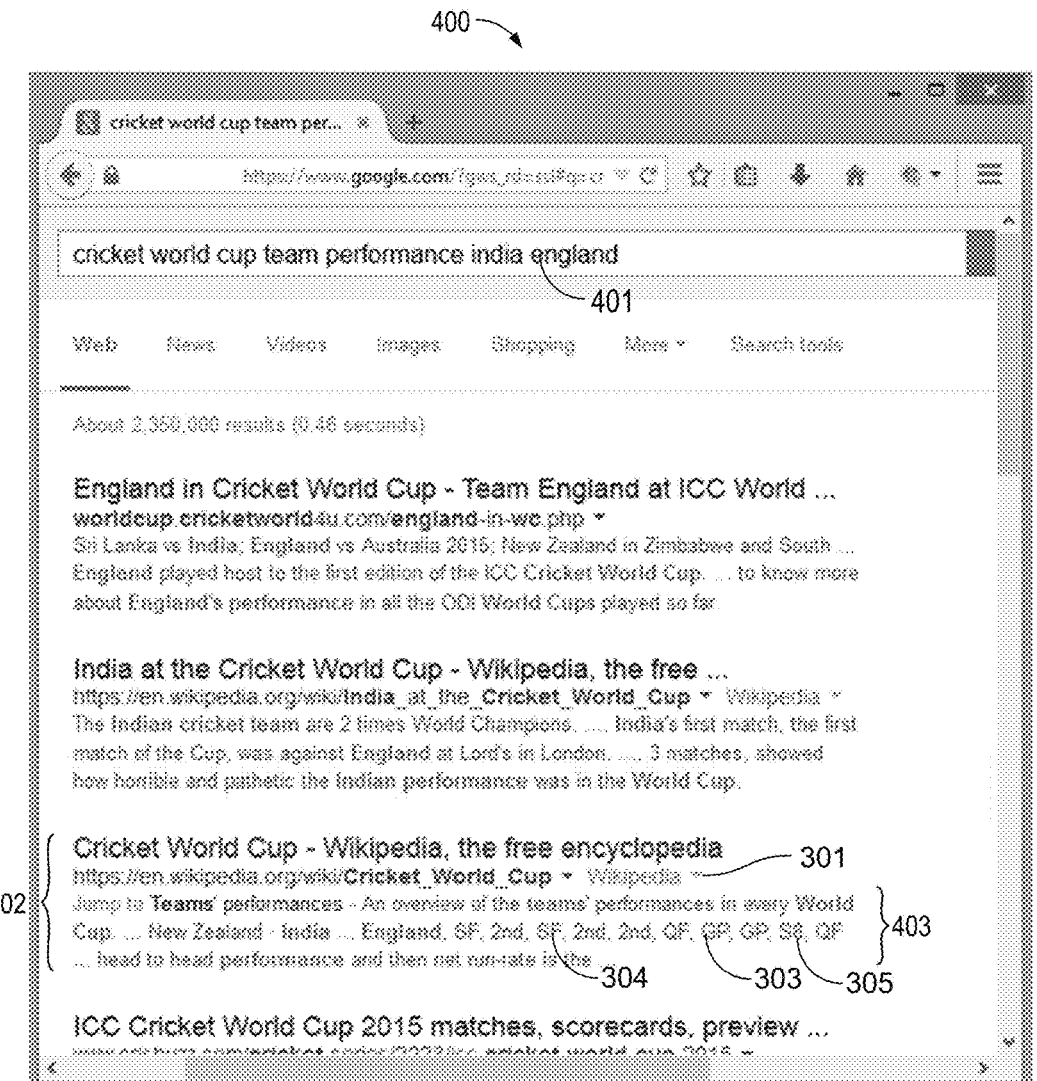
FIG. 4 (Prior Art) and FIG. 5 depict an exemplary search operation with a comparative illustration of known prior art methods and methods in accordance with the present disclosure.

FIG. 4 shows a known prior art method of displaying results of a search operation. When a user enters a search query 401, the search engine performs a search operation and returns the search results to the user in the form of a result page 400. The search result 402 comprises a snippet 403 from the document 300 (FIG. 3) identified by the URL 301 (FIG. 3). The snippet 403 comprises of the symbols 303 (FIG. 3), 304 (FIG. 3) and 305 (FIG. 3). A user looking at the search result 402 may not understand all the symbols in the snippet 403 and it may be time consuming for the user to visit the page 300 (FIG. 3) identified by the URL 301 (FIG. 3).

Note that for simplicity, not all the symbols in the snippet 403 are marked.

Figure 5:

FIG. 5 depicts portion of search results page 500 in accordance with embodiment of the present disclosure. When the user enters a search query 401 (FIG. 4), the search engine unit 110 (FIG. 1) may return search results to the user in the form of the search result page 500. The search result 501 comprises a snippet 502 from the document 300 (FIG. 3) identified by the URL 301. The snippet 502 comprises relevant portions of the table 302 (FIG. 3) from the document 300 and the legend 307 (FIG. 3) associated with the table 302 (FIG. 3) is appended to the search result 501 to enhance user experience.

Note that in one embodiment, the legend appended to the search result may be shown in different presentation semantics than the rest of the search result.

Note that in another embodiment, the legend appended to the search result may be shown in the same presentation semantics and/or form as found in the document.

Further note that the legend may be display to the right, left, top or bottom of the search extract.

Figure 6:
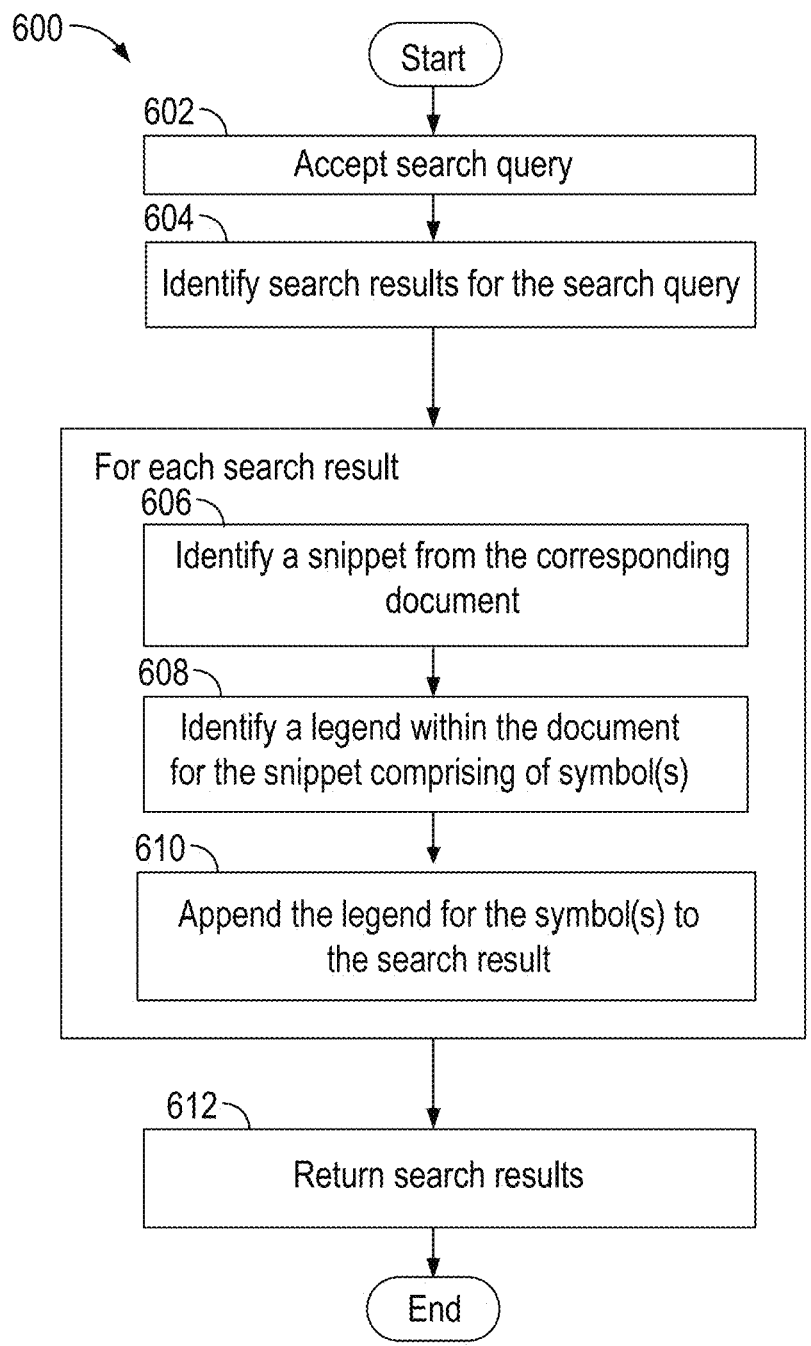
FIG. 6 is a flow diagram of a method of constructing search results incorporating a legend, in accordance with one or more embodiments.

FIG. 6 is a flow chart illustrating one method in accordance with the present disclosure. In step 602, the search engine unit 110 (FIG. 1) may accept the search query comprising the keyword(s)/search term(s). In step 604, the search engine unit 110 (FIG. 1) may find relevant search results. For each relevant search result, steps 606-610 may be performed by the search engine unit 110 (FIG. 1). In step 606, a snippet is identified from the corresponding document. In step 608, the legend identification logic 112 (FIG. 1) may identify a legend within the document for the snippet comprising of symbols. In step 610, the legend identified by the legend identification logic 111 (FIG. 1) may be appended to the snippet of the search result. In step 612, the search results comprising text and legend may be returned.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executable on a computing device comprising a processor, memory and a storage unit to display results of a search operation on at least one data source(s) comprising documents, said method comprising:
   (a) Accepting a search query comprising keyword(s) from a user;
   (b) Generating search results by identifying documents comprising the keyword(s) in response to the search query;
   (c) Constructing a search extract for each search result comprising a relevant portion(s) of the corresponding document;
   (d) Identifying a legend for the search extract from the document; and
   (e) Returning the search results comprising the search result snippet and the legend.

2. The method of claim 1, wherein the legend is displayed to the right, left, top or bottom of the search extract.

3. The method as in claim 1, wherein the legend is identified by a title of the legend in the document.

4. The method as in claim 1, wherein the legend is identified by key/value pair format of the legend and presence of the keys within the search extract.

* * * * *